United States Patent
Zhou et al.

(10) Patent No.: US 12,531,802 B2
(45) Date of Patent: Jan. 20, 2026

(54) PACKET SENDING METHOD AND DEVICE

(71) Applicant: HUAWEI TECHNOLOGIES CO., LTD., Guangdong (CN)

(72) Inventors: Tianran Zhou, Beijing (CN); Yuezhong Song, Beijing (CN); Fang Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 433 days.

(21) Appl. No.: 18/173,334

(22) Filed: Feb. 23, 2023

(65) Prior Publication Data

US 2023/0198891 A1 Jun. 22, 2023

Related U.S. Application Data

(63) Continuation of application No. PCT/CN2021/112696, filed on Aug. 16, 2021.

(30) Foreign Application Priority Data

Aug. 25, 2020 (CN) .......................... 202010863819.6

(51) Int. Cl.
*H04L 12/00* (2006.01)
*H04L 45/00* (2022.01)
*H04L 45/12* (2022.01)

(52) U.S. Cl.
CPC ............ *H04L 45/124* (2013.01); *H04L 45/34* (2013.01)

(58) Field of Classification Search
CPC ....... H04L 45/124; H04L 45/34; H04L 45/02; H04L 45/26; H04L 43/106; H04L 45/24;
(Continued)

(56) References Cited

U.S. PATENT DOCUMENTS 6,389,453 B1 * 5/2002 Willis .................... H04L 45/12
709/227
6,917,983 B1 * 7/2005 Li ......................... H04L 12/18
370/392

(Continued)

FOREIGN PATENT DOCUMENTS

| CN | 102624609 A | 8/2012 |
|----|-------------|--------|
| CN | 103490970 B | 9/2017 |
| CN | 111131021 A | 5/2020 |

OTHER PUBLICATIONS

Extended European Search Report issued in EP21860187.0, dated Dec. 22, 2023, 14 pages.

(Continued)

*Primary Examiner* — Frantz Coby

(57) ABSTRACT

A packet sending method and a device are provided, to improve packet transmission efficiency. The method includes: A first network device receives a first packet from a second network device, where the first packet includes information about a first forwarding path, and the first forwarding path is a forwarding path for sending the first packet from the second network device to the first network device. The first network device obtains information about a second forwarding path based on the information about the first forwarding path, where the second forwarding path is a reverse path of the first forwarding path. The first network device sends a second packet to the second network device through the second forwarding path, where the second packet carries the information about the second forwarding path.

17 Claims, 12 Drawing Sheets

(58) Field of Classification Search
CPC ....... H04L 45/50; H04L 47/125; H04L 69/14; H04L 69/22; H04L 43/0823
USPC .......................... 370/389, 390, 392; 709/227
See application file for complete search history.

(56) References Cited

U.S. PATENT DOCUMENTS

| | | | | |
|---|---|---|---|---|
| 10,498,627 B2* | 12/2019 | Wang | ...................... | H04L 45/26 |
| 11,088,950 B2* | 8/2021 | Li | ...................... | H04L 43/0823 |
| 11,316,783 B2* | 4/2022 | Geng | ................. | H04L 12/4633 |
| 12,273,265 B2* | 4/2025 | Li | ......................... | H04L 45/302 |
| 2014/0169366 A1* | 6/2014 | Kotalwar | ................ | H04L 45/16 |
| | | | | 370/390 |
| 2015/0333921 A1* | 11/2015 | Kannan | ................... | H04L 45/54 |
| | | | | 370/392 |
| 2017/0373968 A1 | 12/2017 | Li | | |
| 2019/0173776 A1* | 6/2019 | Levy | ...................... | H04L 47/11 |
| 2022/0124027 A1* | 4/2022 | Du | .......................... | H04L 45/34 |
| 2022/0224631 A1* | 7/2022 | Dong | ................. | H04L 12/4625 |
| 2022/0255862 A1* | 8/2022 | Wu | ......................... | H04L 45/50 |
| 2023/0060363 A1* | 3/2023 | Liu | ......................... | H04L 45/28 |
| 2023/0095244 A1* | 3/2023 | Xiao | ...................... | H04L 45/26 |
| | | | | 370/392 |
| 2023/0283544 A1* | 9/2023 | Shen | ...................... | H04L 45/02 |
| | | | | 709/238 |
| 2025/0047522 A1* | 2/2025 | Li | .......................... | H04L 12/46 |

OTHER PUBLICATIONS

Zhongqing et al; SR Policy, CISCO, Sep. 2019, total 54 pages.
Office Action issued in CN202010863819.6, dated May 11, 2023, 14 pages.

* cited by examiner

| 0                       | 1                       | 2                       | 3     |
|0 1 2 3 4 5 6 7 8 9|0 1 2 3 4 5 6 7 8 9|0 1 2 3 4 5 6 7 8 9|0 1|

| Vers | Diag | Sta | P | F | C | A | D | R | Detect Mult | Length |
| My Discriminator |
| Your Discriminator |
| Desired Min TX Interval |
| Required Min RX Interval |
| Required Min Echo RX Interval |
| Auth Type | Auth Len | Authentication Data... |

Mandatory: Vers ... Required Min Echo RX Interval
Optional: Auth Type ... Authentication Data

FIG. 3

The trace option data MUST be 4-octet aligned:

PACKET SENDING METHOD AND DEVICE

CROSS-REFERENCE TO RELATED APPLICATIONS

This application is a continuation of International Application No. PCT/CN2021/112696, filed on Aug. 16, 2021, which claims priority to Chinese Patent Application No. 202010863819.6, filed on Aug. 25, 2020. The disclosures of the aforementioned applications are hereby incorporated by reference in their entireties.

TECHNICAL FIELD

The present disclosure relates to the communications field, and in particular, to a packet sending method and a device.

BACKGROUND

To ensure network reliability, two network devices may each send a packet for detection to each other, to determine whether a forward path and a return path between the two network devices are faulty or to obtain some pieces of network performance measurement information such as a latency. In an existing technical solution, when a forward path and a return path between two network devices are co-routed, provided that one of the network devices fails to receive a packet for detection from the peer network device, it is considered that both the forward path and the return path between the two network devices are faulty. Therefore, no data packet is transmitted between the two network devices. "Co-routed" means that same network devices are passed through.

For example, a network device A sends a packet 1 to a network device C by using a network device B, and after receiving the packet 1, the network device C sends a packet 2 to the network device A by using the network device B. That is, a forward path from the network device A to the network device C is: network device A→network device B→network device C. A return path from the network device C to the network device A is: network device C→network device B→network device A. Because both the forward path and the return path pass through the same network devices, it may be considered that the forward path and the return path between the network device A and the network device C are co-routed.

If the network device A receives the packet 2, it is considered that both the forward path from the network device A to the network device C and the return path from the network device C to the network device A are normal, the network device A may continue to send the packet to the network device C, and the network device C may also send the packet to the network device A. If the network device A fails to receive the packet 2, the network device A considers that both the forward path and the return path between the network device A and the network device C are faulty, and does not continue to send the packet to the network device C, so that reliability of data transmission is ensured.

To make the forward path and the return path co-routed, a controller obtains the co-routed forward path and return path between the network devices through calculation, and delivers information about the forward path and the return path to a source device of a packet. The information about the forward path and the return path includes information about the forward path and information about the return path. The source device includes the information about the forward path and the return path in the packet, and sends the packet based on the information about the forward path. After receiving the packet, a destination device of the packet returns the packet to the source device based on the information about the return path carried in the packet. A disadvantage of this manner is mainly that a forward packet includes the information about the return path. This increases a length of the packet and affects transmission efficiency.

SUMMARY

Embodiments of the present disclosure provide a packet sending method and a device, to shorten a length of a forward packet and improve packet transmission efficiency.

According to a first aspect, a packet sending method is provided. The method is applied to a first network device, and the method includes: The first network device receives a first packet from a second network device, where the first packet includes information about a first forwarding path, and the first forwarding path is a forwarding path for sending the first packet from the second network device to the first network device, or may be considered as a forward path from the second network device to the first network device. The first network device obtains information about a second forwarding path based on the information about the first forwarding path, where the second forwarding path is a reverse path of the first forwarding path. The reverse path means that the network devices through which the first forwarding path passes are the same as the network devices through which the second forwarding path passes, and sequences of passing through the network devices are reverse to each other. Therefore, the second forwarding path may be considered as a return path from the first network device to the second network device. Finally, the first network device sends a second packet to the second network device through the second forwarding path, so that the forward path and the return path are co-routed. The second packet may carry the information about the second forwarding path. Because the first packet carries only the information about the forward path, and does not carry information about the return path, and the first network device can obtain the information about the return path based on the information about the forward path, a length of a forward packet decreases while it is ensured that a forward path and a return path are co-routed, and packet transmission efficiency is improved.

In a possible design, the first packet includes indication information, and the obtaining, by the first network device, information about a second forwarding path based on the information about the first forwarding path includes: The first network device obtains the information about the second forwarding path based on the information about the first forwarding path and an indication of the indication information. In other words, the first network device can obtain the information about the return path based on the indication of the indication information in the first packet, and then send the second packet. It can be learned that the first packet and another type of packet received by the first network device can be distinguished from each other by using the indication information, to improve processing efficiency.

There is a plurality of possible implementations of a position of the indication information carried in the first packet.

In a possible design, the first packet is a bidirectional forwarding detection (BFD) packet, and the indication information is carried in a reserved R field of the BFD packet.

In another possible design, the first packet is a two-way active measurement protocol (TWAMP) packet or a simple two-way active measurement protocol (STAMP) packet, and the indication information is carried in a type length value (TLV) field of the TWAMP packet or the STAMP packet.

In still another possible design, the first packet is a seamless bidirectional forwarding detection (SBFD) packet, and the indication information is carried in an internet protocol version 6 (IPv6) extension header of the SBFD packet, for example, a segment routing header (SRH), a hop-by-hop option header (HBH), or a destination options header (DOH).

Certainly, a specific implementation of the position of the indication information does not constitute a limitation on the technical solutions of the present disclosure, and people skilled in the art may design an implementation based on an actual situation.

In a possible design, the first forwarding path passes through a third network device, and the information about the first forwarding path includes an identifier of the third network device, so that the second forwarding path determined by the first network device passes through the third network device.

In a possible design, the first forwarding path passes through a third network device, and the information about the first forwarding path includes a segment identifier (SID) corresponding to an interface used by the third network device to receive the first packet. In this way, the information about the second forwarding path determined by the first network device also includes the SID, so that the third network device can finally send the second packet through the interface corresponding to the SID. This not only ensures that a forward path and a return path share the network device, but also ensures that the forward path and the return path share a link, and is especially applicable to a scenario with load sharing.

In the present disclosure, there is also a plurality of possible implementations of the position of the information about the first forwarding path carried in the first packet.

In a possible design, the first packet includes in-band operations, administration and maintenance (IOAM) or in-band network telemetry (INT), and the IOAM or the INT includes the information about the first forwarding path.

In another possible design, the first packet includes an SRH, and the SRH includes the information about the first forwarding path.

Specifically, the information about the first forwarding path includes a first segment identifier list (SID list), the information about the second forwarding path includes a second SID list, and segment identifiers (SIDs) included in the second SID list and SIDs included in the first SID list are the same, and are arranged in sequences reverse to each other.

Certainly, the foregoing implementations do not constitute a limitation on the technical solutions of the present disclosure, and people skilled in the art may design an implementation based on an actual situation.

In another possible design, the first packet may further carry network performance measurement information of a network device on the first forwarding path, and the second packet may further carry network performance measurement information of a network device on the second forwarding path. The network performance measurement information includes, for example, information such as a timestamp.

In a possible design, after that the first network device receives a first packet from a second network device, the method further includes: The first network device determines that a link between the first network device and the second network device is normal. In other words, the first packet may be used for link fault detection. Similarly, if receiving the second packet from the first network device, the second network device determines that the link between the second network device and the first network device is normal.

In a possible design, the first network device and the second network device belong to different network domains. The network domain may be, for example, an interior gateway protocol (IGP) domain, an IPV6-based segment routing (SR) (hereinafter referred to as "SRv6") domain, or a segment routing (SR) multiprotocol label switching (MPLS) domain. That is, the method provided in the present disclosure is applicable to a cross-domain scenario.

According to a second aspect, a packet sending method is provided. The method is applied to a second network device, and the method includes the following steps: The second network device obtains a first packet, where the first packet includes information about a first forwarding path, the first forwarding path is a forwarding path for sending the first packet from the second network device to a first network device, the information about the first forwarding path is used by the first network device to obtain information about a second forwarding path, and the second forwarding path is a reverse path of the first forwarding path. The second network device sends the first packet to the first network device. Because the first packet carries only the information about the forward path, and does not carry information about the return path, and the first network device can obtain the information about the return path based on the information about the forward path, a length of a forward packet decreases while it is ensured that a forward path and a return path are co-routed, and packet transmission efficiency is improved.

In a possible design, the first packet further includes indication information, and the indication information indicates the first network device to obtain the information about the second forwarding path based on the information about the first forwarding path. The first packet and another type of packet received by the first network device are distinguished from each other by using the indication information, to improve processing efficiency of the first network device.

For the indication information and a position of the information about the first forwarding path carried in the first packet, refer to the foregoing descriptions. Details are not described herein again.

In a possible design, the information about the first forwarding path includes an identifier of the second network device, to notify the first network device that the first forwarding path includes the second network device.

According to a third aspect, a packet sending method is provided, and is applied to an intermediate network device. The method includes the following steps: The intermediate network device obtains a first packet, where the first packet includes partial information of a first forwarding path, the first forwarding path is a forwarding path for sending the first packet from a source device to a destination device, the partial information of the first forwarding path is used by the destination device to obtain information about a second forwarding path, the second forwarding path is a reverse path of the first forwarding path, and the second forwarding path is from the destination device to the source device. The intermediate network device sends the first packet to the destination device. Because the first packet carries only the information about the forward path, and does not carry information about the return path, and the first network device can obtain the information about the return path based on the information about the forward path, a length of a forward packet decreases while it is ensured that a forward path and a return path are co-routed, and packet transmission efficiency is improved.

In a possible design, the method further includes: The intermediate network device receives a second packet, where the second packet is from a previous-hop network device of the intermediate network device on the first forwarding path. The intermediate network device adds a segment identifier of the intermediate network device in the second packet to generate the first packet, where the partial information of the first forwarding path includes the segment identifier of the intermediate network device, so that the packet sent by the destination device to the source device passes through the intermediate network device, and a forward path and a return path are co-routed.

In a possible design, the partial information of the first forwarding path further includes a segment identifier of an interface used by the intermediate network device to receive the second packet, and that the intermediate network device adds a segment identifier of the intermediate network device in the second packet to generate the first packet includes: The intermediate network device adds the segment identifier of the interface for receiving the second packet and the segment identifier of the intermediate network device in the second packet to generate the first packet, so that the packet sent by the destination device to the source device not only passes through the intermediate network device, but also passes through a same link, and a forward path and a return path are co-routed.

In a possible design, before that the intermediate network device adds the segment identifier of the interface for receiving the second packet and the segment identifier of the intermediate network device in the second packet to generate the first packet, the method further includes: The intermediate network device determines that there are a plurality of links to the previous-hop network device, in other words, load sharing needs to be performed between the intermediate network device and the previous-hop network device, where the interface for receiving the second packet is an interface corresponding to one of the plurality of links, so that it is ensured that the forward path and the return path not only share the network device, but also share the link.

In a possible design, the partial information of the first forwarding path further includes an identifier of the previous-hop network device. That the intermediate network device adds the segment identifier of the interface for receiving the second packet and the segment identifier of the intermediate network device in the second packet to generate the first packet includes: The intermediate network device replaces the identifier of the previous-hop network device in the second packet with the segment identifier of the interface for receiving the second packet and the segment identifier of the intermediate network device, to decrease a length of the second packet and improve packet transmission efficiency.

In a possible design, the partial information of the first forwarding path includes information about a path from the source device to the intermediate network device.

In a possible design, the information about the first forwarding path is a first segment identifier list (SID list), the information about the second forwarding path is a second SID list, and segment identifiers (SIDs) included in the second SID list and SIDs included in the first SID list are the same, and are arranged in sequences reverse to each other.

In a possible design, the source device and the destination device belong to different network domains.

According to a fourth aspect, a first network device is provided, including: a receiving unit, configured to receive a first packet from a second network device, where the first packet includes information about a first forwarding path, and the first forwarding path is a forwarding path for sending the first packet from the second network device to the first network device: a processing unit, configured to obtain information about a second forwarding path based on the information about the first forwarding path, where the second forwarding path is a reverse path of the first forwarding path; and a sending unit, configured to send a second packet to the second network device through the second forwarding path, where the second packet carries the information about the second forwarding path.

In a possible design, the first packet includes indication information; and
  the processing unit is configured to obtain the information about the second forwarding path based on the information about the first forwarding path and an indication of the indication information.

According to a fifth aspect, a second network device is provided, including: a processing unit, configured to obtain a first packet, where the first packet includes information about a first forwarding path, the first forwarding path is a forwarding path for sending the first packet from the second network device to a first network device, the information about the first forwarding path is used by the first network device to obtain information about a second forwarding path, and the second forwarding path is a reverse path of the first forwarding path; and a sending unit, configured to send the first packet to the first network device.

In a possible design, the first packet further includes indication information, and the indication information indicates the first network device to obtain the information about the second forwarding path based on the information about the first forwarding path.

According to a sixth aspect, an intermediate network device is provided, including: a processing unit, configured to obtain a first packet, where the first packet includes partial information of a first forwarding path, the first forwarding path is a forwarding path for sending the first packet from a source device to a destination device, the partial information of the first forwarding path is used by the destination device to obtain information about a second forwarding path, the second forwarding path is a reverse path of the first forwarding path, and the second forwarding path is from the destination device to the source device; and a sending unit, configured to send the first packet to the destination device.

In a possible design, the third network device further includes: a receiving unit, configured to receive a second packet, where the second packet is from a previous-hop network device of the intermediate network device on the first forwarding path, where the processing unit is further configured to add a segment identifier of the intermediate network device in the second packet to generate the first packet, where the partial information of the first forwarding path includes the segment identifier of the intermediate network device.

In a possible design, the partial information of the first forwarding path further includes a segment identifier of an interface used by the intermediate network device to receive the second packet, and that the processing unit adds a segment identifier of the intermediate network device in the second packet to generate the first packet includes: The processing unit adds the segment identifier of the interface for receiving the second packet and the segment identifier of the intermediate network device in the second packet to generate the first packet.

In a possible design, before adding, by the intermediate network device, the segment identifier of the interface for receiving the second packet and the segment identifier of the intermediate network device in the second packet to generate the first packet, the processing unit is further configured to determine that there are a plurality of links to the previous-hop network device, where the interface for receiving the second packet is an interface corresponding to one of the plurality of links.

In a possible design, the partial information of the first forwarding path further includes an identifier of the previous-hop network device; and that the processing unit adds the segment identifier of the interface for receiving the second packet and the segment identifier of the intermediate network device in the second packet to generate the first packet includes:
The processing unit replaces the identifier of the previous-hop network device in the second packet with the segment identifier of the interface for receiving the second packet and the segment identifier of the intermediate network device.

According to a seventh aspect, a network system is provided. The network system includes at least two of a first network device, a second network device, and an intermediate network device, the first network device is the first network device according to any one of the possible designs of the first aspect, the second network device is the second network device according to any one of the possible designs of the second aspect, and the intermediate network device is the intermediate network device according to any one of the possible designs of the third aspect.

According to an eighth aspect, a computer-readable storage medium is provided, including instructions, a program, or code. When the instructions, the program, or the code is executed on a computer, the computer is enabled to perform the method according to any one of the possible designs of the first aspect, the second aspect, or the third aspect.

According to a ninth aspect, a chip is provided, including a memory and a processor. The memory is configured to store instructions or program code, and the processor is configured to invoke the instructions or the program code from the memory and run the instructions or the program code, to perform the method according to any one of the possible designs of the first aspect, the second aspect, or the third aspect.

In a possible design, the chip includes only the processor, and the processor is configured to read and execute the instructions or the program code stored in the memory. When the instructions or the program code is executed, the processor performs the method according to any one of the first aspect or the possible designs of the first aspect: the processor performs the method according to any one of the second aspect or the possible designs of the second aspect: or the processor performs the method according to any one of the third aspect or the possible designs of the third aspect.

According to a tenth aspect, a computer program product including computer instructions is provided. When the computer program product runs on a network device, the network device is enabled to perform the method according to any one of the possible designs of the first aspect, the second aspect, or the third aspect.

BRIEF DESCRIPTION OF DRAWINGS

FIG. 3 is a schematic diagram of a format of a BFD packet according to an embodiment of the present disclosure;

DESCRIPTION OF EMBODIMENTS

To make a forward path and a return path between network devices co-routed, in a conventional manner, a controller obtains the co-routed forward path and return path through calculation, and delivers information about the forward path and the return path to a source device, and the source device includes the information about the forward path and the return path in a packet, so that a destination device of the packet sends the packet to the source device along an original path based on the information about the return path.

Figure 1:
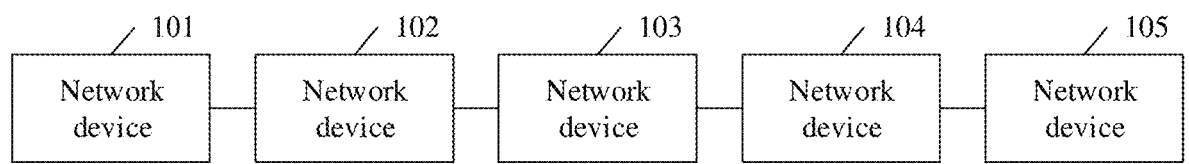
FIG. 1 is a schematic diagram of a segment routing SR MPLS network architecture according to an embodiment of the present disclosure.

For example, FIG. 1 is a schematic diagram of an SR MPLS network architecture. In the figure, the SR-MPLS network architecture includes a network device 101, a network device 102, a network device 103, a network device 104, and a network device 105. The network device 101 is connected to the network device 102, the network device 102 is connected to the network device 103, the network device 103 is connected to the network device 104, and the network device 104 is connected to the network device 105. The network device 101 may be considered as a source device, and the network device 105 may be considered as a destination device.

A label of the network device 101 is 16001, a label of the network device 102 is 16002, a label of the network device 103 is 16003, a label of the network device 104 is 16004, and a label of the network device 105 is 16005.

A controller obtains, through calculation according to an SR policy of a data packet that needs to be transmitted, a forward path from the network device 101 to the network device 105 and a return path from the network device 105 to the network device 101, and generates a label stack corresponding to a forward-return path that includes the forward path and the return path. The label stack includes the labels 16003, 16004, 16005, 16004, 16003, and 16001.

The controller delivers the label stack to the network device 101. The network device 101 includes the label stack in a packet 1 that arrives at the network device 105 when generating the packet 1, and sends the packet 1 to the network device 103 based on a topmost label of the label stack, namely, the label 16003. The packet 1 arrives at the network device 105 after passing through the network device 103 and the network device 104. After receiving the packet 1, the network device 105 obtains a label corresponding to the return path, and adds a label stack that includes the labels 16004, 16003, and 16001 in a packet 2 sent to the network device 101, so that the packet 2 arrives at the network device 101 along a path reverse to the path of the packet 1.

If the network device 101 receives the packet 2, it indicates that both the forward path and the return path between the network device 101 and the network device 105 are normal, and the network device 101 may continue to send the packet to the network device 105. If the network device 101 fails to receive the packet 2, it indicates that both the forward path and the return path between the network device 101 and the network device 105 are faulty, and the network device 101 does not continue to send the packet to the network device 105.

It can be learned that in a conventional manner, the forward packet carries a relatively large amount of information, resulting in a long length of the packet. This affects packet transmission efficiency.

To resolve the foregoing technical problem, embodiments of the present disclosure provide a packet sending method and a device, to decrease the length of the forward packet and improve the packet transmission efficiency while making the forward path and the return path co-routed.

The following uses the network architecture shown in FIG. 1 as a possible application scenario to describe the packet sending method provided in embodiments of the present disclosure. The network device 101, the network device 102, the network device 103, the network device 104, and the network device 105 may be hardware devices such as a router or a switch. This is not specifically limited in the present disclosure. The network architecture shown in FIG. 1 is applicable to an internet protocol version 6 (IPv6)-based segment routing (SR) (hereinafter referred to as "SRv6") scenario. In this scenario, a (SID) of the network device 101 is 20001, an SID of the network device 102 is 20002, an SID of the network device 103 is 20003, an SID of the network device 104 is 20004, and an SID of the network device 105 is 20005.

Figure 2A:
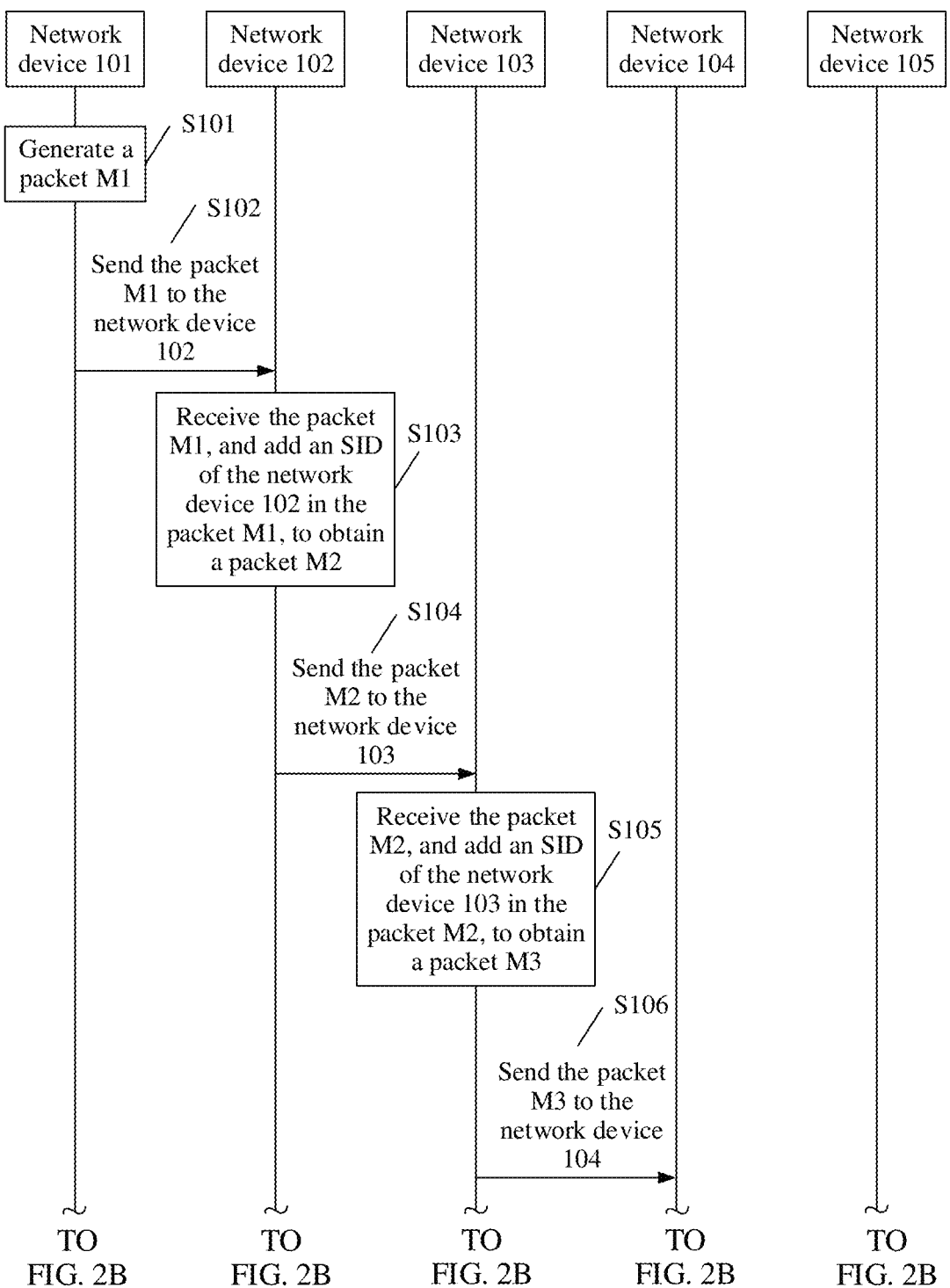
FIG. 2A and FIG. 2B are a schematic flowchart of a packet sending method according to an embodiment of the present disclosure.
Figure 2B:
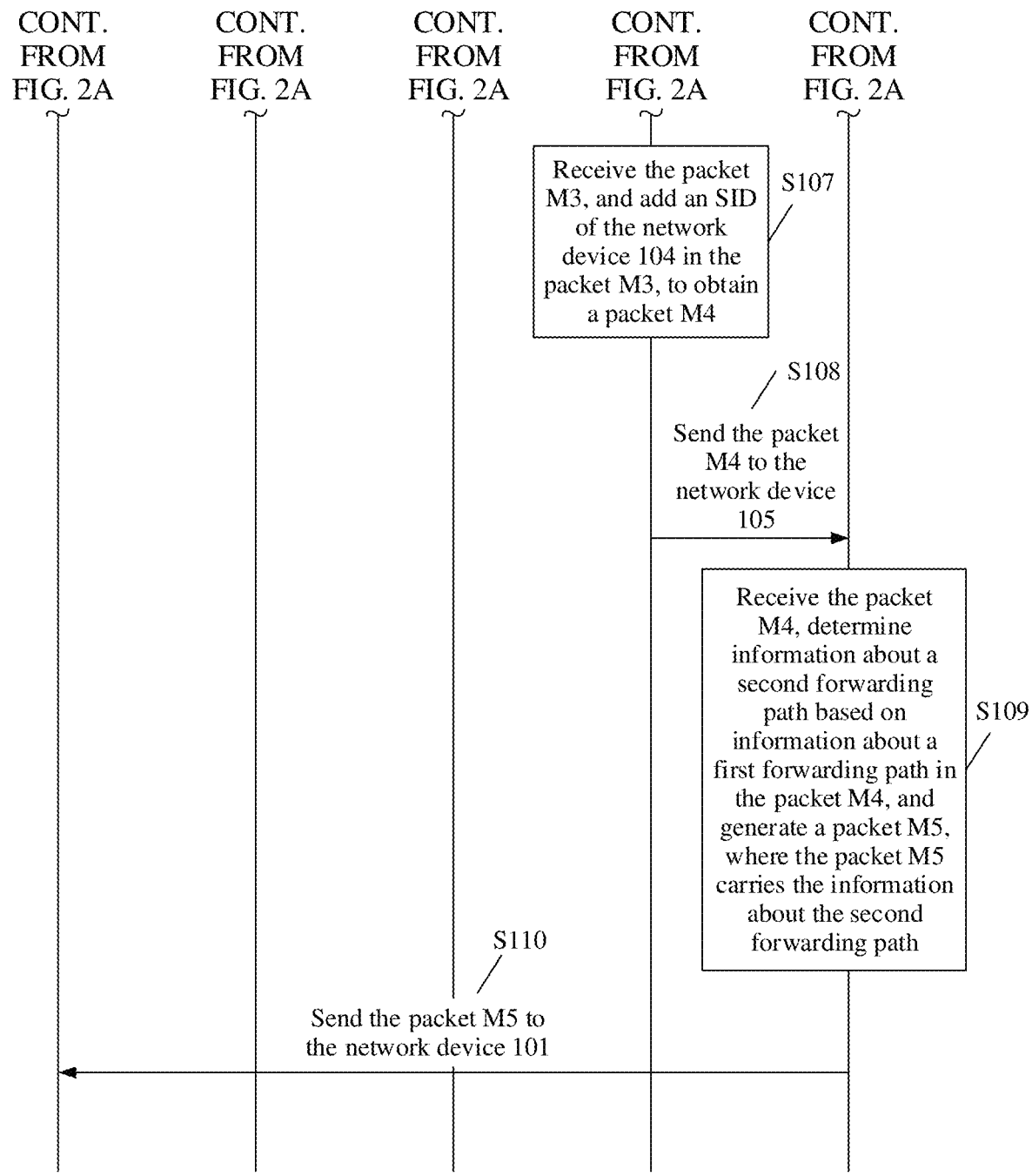

FIG. 2A and FIG. 2B are a schematic flowchart of a packet sending method according to an embodiment of the present disclosure.

The packet sending method provided in this embodiment of the present disclosure includes the following steps.

S101: A network device 101 generates a packet M1.

In this embodiment, the packet M1 may be a detection packet used to detect whether a path between a source device (namely, the network device 101) and a destination device (namely, the network device 105) is faulty or to obtain network performance measurement information such as a latency. The packet M1 may be a bidirectional forwarding detection (BFD) packet, a two-way active measurement protocol (TWAMP) packet, a simple two-way active measurement protocol (STAMP) packet, a seamless bidirectional forwarding detection (SBFD) packet, or the like. This is not specifically limited in the present disclosure.

In this embodiment, the packet M1 may include a segment routing header (SRH), the SRH includes a segment identifier list (SID list), and the segment identifier list identifies a first forwarding path. The first forwarding path is a forward path from the source device to the destination device. The segment identifier list includes a segment identifier of one or more network devices through which the first forwarding path passes. For example, the segment identifier list includes an SID 20003 of the network device 103 and an SID 20005 of the network device 105. In other words, the segment identifier list may not include SIDs corresponding to all network devices through which the packet M1 passes, but include an SID corresponding to some network devices.

Optionally, the packet M1 may further include an identifier of the source device. The identifier of the source device may be carried in the packet M1 as a part of information about the first forwarding path. The information about the first forwarding path may be used to determine a second forwarding path. The second forwarding path is a return path from the destination device to the source device. In this embodiment, the second forwarding path is a reverse path of the first forwarding path. To be specific, network devices through which the second forwarding path passes are the same as network devices through which the first forwarding path passes, and sequences of passing through the network devices are reverse to each other. In this embodiment, the information about the first forwarding path may be carried in a payload of the packet M1.

In addition, the packet M1 may further include indication information, where the indication information indicates the destination device to obtain information about the second forwarding path based on the information about the first forwarding path, so that the information about the second forwarding path is carried in a packet M5 forwarded to the source device (for details, see the following), and the packet M5 can arrive at the source device along the second forwarding path.

In this embodiment, due to a different type of the packet M1, the indication information may also be carried in a different position of the packet M1.

FIG. 3 is a schematic diagram of a format of a BFD packet. In FIG. 3, the BFD packet includes a protocol version number Vers field, a diagnostic field Diag field, a BFD local state Sta field, a flag P field, a flag F field, a forwarding/control separation flag C field, an authentication identifier A field, a query request D field, a reserved R field, a detection timeout multiplier Detect Mult field, a packet length Length field, a local discriminator My Discriminator field, a remote discriminator Your Discriminator field, a locally supported minimum packet sending interval Desired Min Tx Interval field, a locally supported minimum packet receiving interval Required Min Rx Interval field, a locally supported minimum echo packet interval Required Min Echo Interval, an authentication type Auth Type field, an authentication data length Auth Length field, and an authentication data Authentication Data field.

If the packet M1 is the BFD packet, the indication information may be carried in the reserved R field or another field of the BFD packet. This is not specifically limited in this embodiment.

Figure 4:
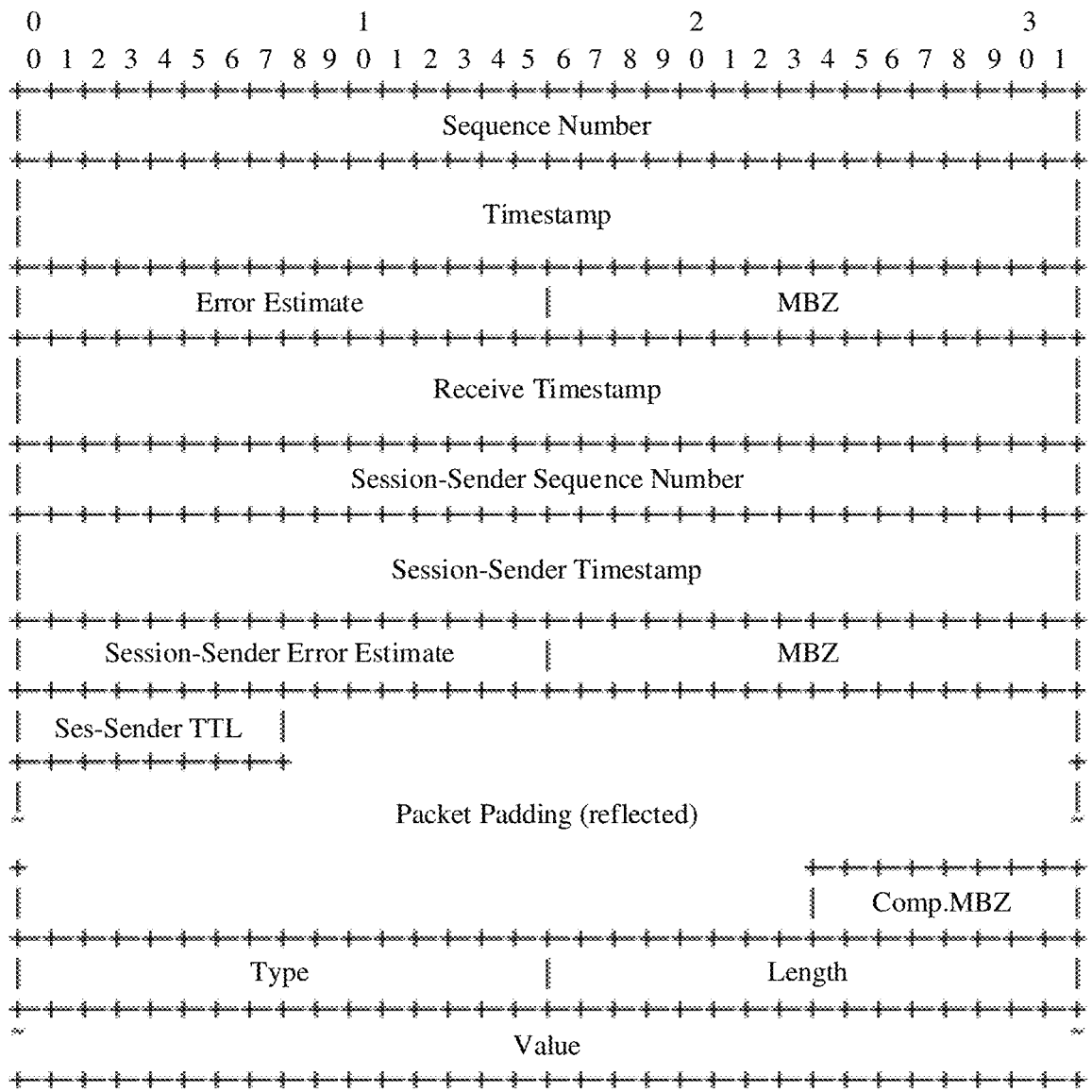
FIG. 4 is a schematic diagram of a format of a TWAMP packet according to an embodiment of the present disclosure.

FIG. 4 is a schematic diagram of a format of a TWAMP packet. In FIG. 4, the TWAMP packet includes a sequence number field, a timestamp field, an error estimate field, an MBZ field, a receive timestamp field, a session-sender sequence number field, a session-sender timestamp field, a session-sender error estimate field, a session-sender time to live (Ses-Sender TTL) field, a reflected packet padding (Packet Padding (reflected)) field, a comp.MBZ field, and a type length value (TLV) field.

If the packet M1 is the TWAMP packet, the indication information may be carried in the TLV field of the TWAMP packet or an STAMP packet. A format of the STAMP packet is similar to that of the TWAMP packet. Details are not described herein again. If the packet M1 is an STAMP packet, the indication information may be carried in a TLV field of the STAMP packet.

If the packet M1 is an SBFD packet, the indication information may be carried in an IPv6 extension header of the SBFD packet, for example, an SRH.

Certainly, there may be further another possible implementation for the carried position of the indication information, and people skilled in the art may design an implementation based on an actual situation. Details are not described herein again.

S102: The network device 101 sends the packet M1 to a network device 102.

S103: The network device 102 receives the packet M1, and adds an SID of the network device 102 in the packet M1, to obtain a packet M2.

In this embodiment, the information about the first forwarding path includes the SID 20002 of the network device 102. In other words, the network device 102 adds the SID of the network device 102 in the payload of the packet M1, to obtain the packet M2.

S104: The network device 102 sends the packet M2 to a network device 103.

S105: The network device 103 receives the packet M2, and adds an SID of the network device 103 in the packet M2, to obtain a packet M3.

In this embodiment, the information about the first forwarding path further includes the SID 20003 of the network device 103. In other words, the network device 103 adds the SID of the network device 103 in a payload of the packet M2, to obtain the packet M3.

In this embodiment, there may be a plurality of links between the network device 102 and the network device 103. The plurality of links may be physical links or logical links, and are used for load sharing. It is assumed that the network device 102 is connected to the network device 103 over a link 1 and a link 2. When sending the packet M2, the network device 102 determines, through calculation of load sharing, to send the packet M3 to the network device 103 over the link 1.

To ensure that the forward path and the return path are co-routed, the network device 103 may add, in the packet M2, an SID corresponding to an interface used by the network device 103 to receive the packet M2, where the SID identifies the link between the network device 102 and the network device 103. It is assumed that an SID of an interface corresponding to the link 1 is 32001, and an SID of an interface corresponding to the link 2 is 32002. Because the network device 103 receives the packet M2 over the link 1, the network device 103 may add the SID 32001 of the interface corresponding to the link 1 in the packet M2, to obtain the packet M3. The SID 32001 may be an SID of an END.X type.

Optionally, to decrease a packet length without affecting packet forwarding, when the information about the first forwarding path includes the SID 32001, the network device 103 may delete the SID 20002 of the network device 102 from the packet M2, in other words, replace the SID 20002 with the SID 32001.

S106: The network device 103 sends the packet M3 to a network device 104.

S107: The network device 104 receives the packet M3, and adds an SID of the network device 104 in the packet M3, to obtain a packet M4.

In this embodiment, the information about the first forwarding path further includes the SID 20004 of the network device 104. In other words, the network device 104 adds the SID of the network device 104 in a payload of the packet M3, to obtain the packet M4.

S108: The network device 104 sends the packet M4 to a network device 105.

S109: The network device 105 receives the packet M4, determines information about a second forwarding path based on information about a first forwarding path in the packet M4, and generates a packet M5, where the packet M5 carries the information about the second forwarding path.

Figure 5:
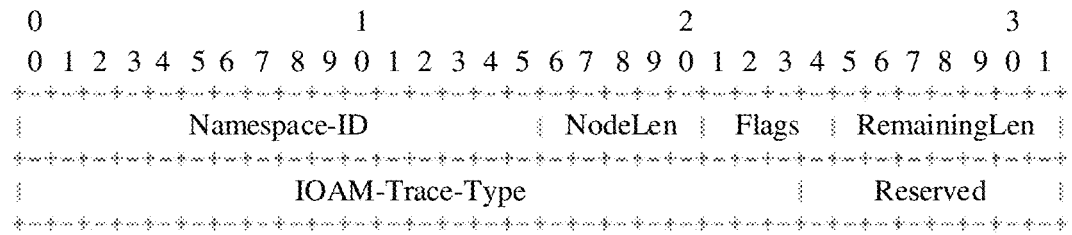
FIG. 5 is a schematic diagram of a format of IOAM according to an embodiment of the present disclosure.
Figure 5:
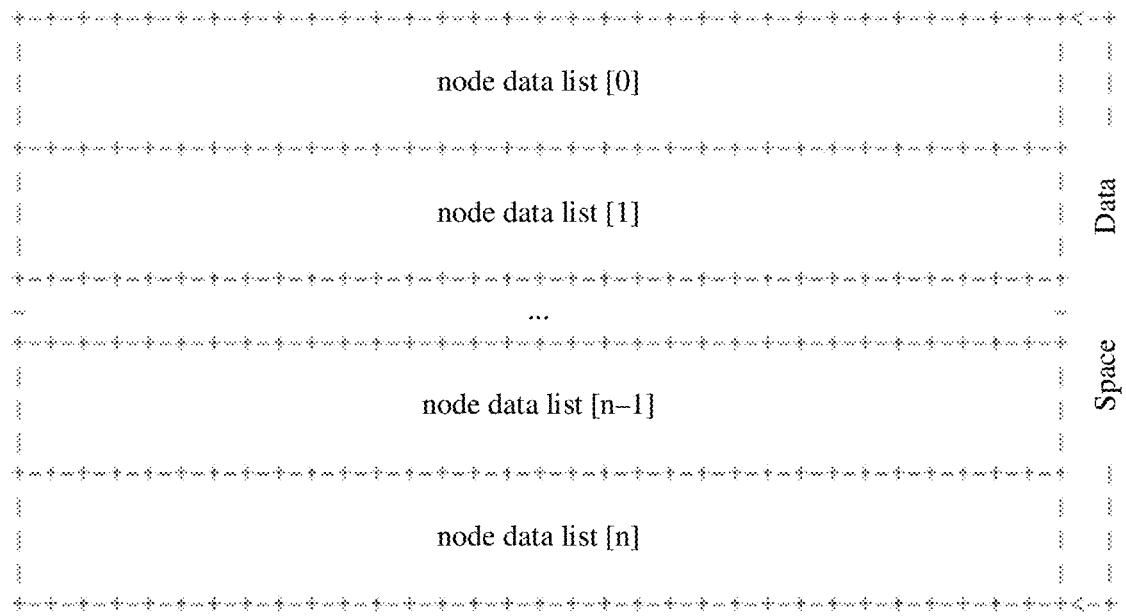

In a possible implementation, the packet M1 to the packet M4 may carry in-band operations, administration and maintenance (IOAM). FIG. 5 is a schematic diagram of a format of IOAM. In FIG. 5, the IOAM includes a namespace identifier (namespace ID) field, a node length (NodeLen) field, a flags field, a remaining length (RemainingLen) field, an IOAM-trace-type field, a reserved field, and a node data list field. An SID list corresponding to the first forwarding path may be carried in the node data list field.

In another possible implementation, the packet M1 to the packet M4 may carry in-band network telemetry (INT), and the SID list corresponding to the first forwarding path may be carried in the INT.

In this embodiment, if there are no a plurality of links between the network device 102 and the network device 103, in other words, in a scenario without load sharing, the information about the first forwarding path in the packet M4 may include the SID list: 20001, 20002, 20003, and 20004. In the foregoing scenario with load sharing, the information about the first forwarding path in the packet M4 may include the SID list: 20001, 32001, 20003, and 20004.

Regardless of the foregoing scenarios, the network device 105 may determine the information about the second forwarding path based on the information about the first forwarding path. Specifically, the network device 105 reverses a sequence of the SIDs in the SID list corresponding to the first forwarding path, to obtain an SID list corresponding to the second forwarding path. In other words, the SIDs included in the SID list corresponding to the first forwarding path and SIDs included in the SID list corresponding to the second forwarding path are the same, and are arranged in sequences reverse to each other.

For example, if the SID list corresponding to the first forwarding path is: 20001, 20002, 20003, and 20004, the SID list corresponding to the second forwarding path may be: 20004, 20003, 20002, and 20001. If the SID list corresponding to the first forwarding path is: 20001, 32001, 20003, and 20004, the SID list corresponding to the second forwarding path may be: 20004, 20003, 32001, and 20001.

After obtaining the SID list corresponding to the second forwarding path, the network device 105 may generate a packet M5 including the SID list. The SID list corresponding to the second forwarding path may be carried in an SRH of the packet M5, to guide forwarding of the packet M5.

S110: The network device 105 sends the packet M5 to a network device 101.

In this embodiment, S110 comprises: The network device 105 sends a packet M5 to the network device 104, the network device 104 sends the packet M5 to the network device 103, the network device 103 sends the packet M5 to the network device 102, the network device 102 sends the packet M5 to the network device 101, and finally, the packet M5 arrives at the network device 101.

It should be noted that, if there are a plurality of links between the network device 103 and the network device 102, when the network device 103 determines, based on a destination address in the packet M5 (namely, the SID of the network device 102), that a next-hop network device is the network device 102, the network device 103 may send the packet M5 through an outbound interface corresponding to the SID 32001 in the SID list, so that the packet M5 is transmitted to the network device 102 over the link 1. This ensures that the forward path and the return path are co-routed.

After receiving the packet M5, the network device 101 may determine that both the forward path and the return path between the network device 101 and the network device 105 are normal, and may continue to send the packet to the network device 105, which includes a data packet. If the network device 101 fails to receive the packet M5, it is considered that the forward path and the return path between the network device 101 and the network device 105 are faulty, and therefore, the network device 101 does not continue to send the packet to the network device 105.

In conclusion, because the packet M4 carries only the information about the forward path (namely, the first forwarding path) from the network device 101 to the network device 105, and does not carry the information about the return path (namely, the second forwarding path), after receiving the packet M4, the network device obtains the information about the return path based on the information about the forward path, so that the length of the packet sent by the network device 101 decreases while the forward path and the return path are co-routed, and packet transmission efficiency is improved.

In addition, in this embodiment, the information about the return path is obtained by the network device 105 based on the information about the forward path in the packet M4, but is not obtained by using the controller through calculation. Therefore, there is no need to rely on the controller. This embodiment expands an application scope compared with a conventional technology, for example, is applicable to some cross-domain scenarios.

For example, it is assumed that the network device 101 and the network device 102 belong to a network domain 1, the network device 103 to the network device 105 belong to a network domain 2, the network domain 1 corresponds to a controller 1, and the network domain 2 corresponds to a controller 2. To be specific, the controller 1 can obtain, through calculation, only a forwarding path between the network devices in the network domain 1, and the controller 2 can obtain, through calculation, only a forwarding path between the network devices in the network domain 2. Therefore, if obtaining the return path through calculation in a conventional manner, the controller cannot obtain the path through calculation across domains. As a result, the forward path and the return path cannot be co-routed. However, in the packet sending method shown in FIG. 2A and FIG. 2B, there is no need for the controller to obtain the return path through calculation, but the network device 105 determines the return path based on the information about the first forwarding path in the packet M4. Therefore, this is applicable to the foregoing cross-domain scenarios.

In addition, the scenario with load sharing is not applicable when the return path is obtained through pre-calculation in the conventional manner. The reason is that load sharing means that after receiving a packet, a specific network device determines, through calculation, to use one of a plurality of links to forward the packet, and the information cannot be reflected in the obtained forward path and return path through pre-calculation. In other words, in the conventional manner, it can only be ensured that both the forward path and the return path pass through the same network device, but it cannot be ensured that the forward path and the return path also pass through the same link in the scenario with load sharing. However, according to the packet sending method provided in this embodiment, the forward packet carries the SID for return corresponding to the interface used by the network device that needs to perform load sharing to receive the forward packet, so that it can be ensured that a return packet also passes through the same link as the forward packet, and the forward path and the return path are co-routed truly.

Figure 6:
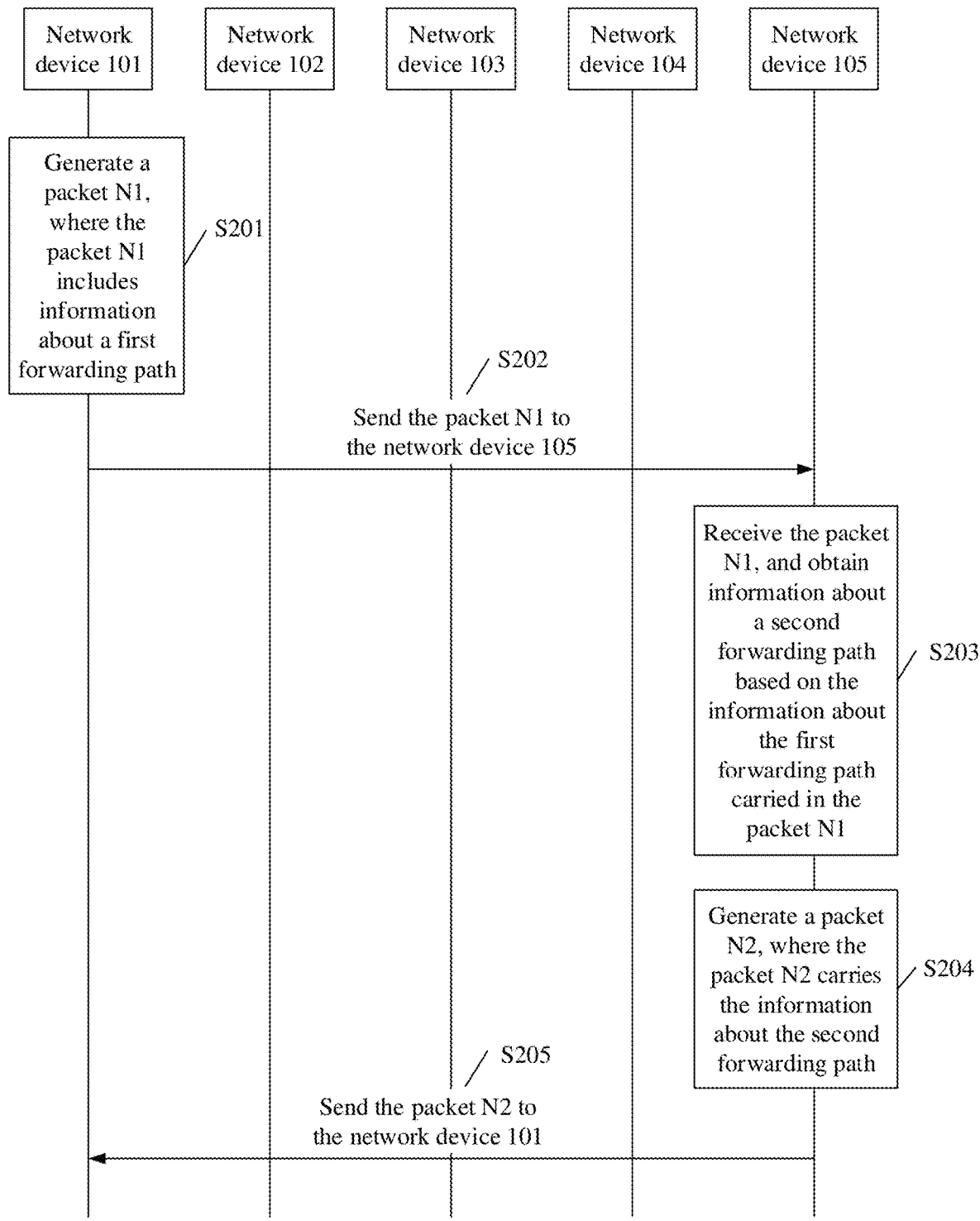
FIG. 6 is a schematic flowchart of another packet sending method according to an embodiment of the present disclosure.

FIG. 6 is another schematic flowchart of a packet sending method according to an embodiment of the present disclosure.

The packet sending method provided in this embodiment includes the following steps.

S201: A network device 101 generates a packet N1, where the packet N1 includes information about a first forwarding path.

In this embodiment, the packet N1 may be a detection packet used to detect whether a path between a source device (namely, the network device 101) and a destination device (namely, the network device 105) is faulty or to obtain network performance measurement information such as a latency. A packet type of the packet N1 is similar to a packet type of the packet M1. Details are not described herein again.

In this embodiment, the packet N1 includes an SRH, the SRH includes an SID list, the SID list includes the information about the first forwarding path, and the first forwarding path is a forward path from the network device 101 to the network device 105. For example, the SID list includes 20001, 20002, 20003, 20004, and 20005.

Optionally, the packet N1 may further include indication information, indicating a destination device of the packet N1, namely, the network device 105, after receiving the packet N1, to obtain information about a second forwarding path based on the information about the first forwarding path. The second forwarding path is a reverse path of the first forwarding path, in other words, the first forwarding path and the second forwarding path are co-routed.

A position of the indication information carried in the packet N1 is similar to the position of the indication information carried in the packet M1. Details are not described herein again.

S202: The network device 101 sends the packet N1 to a network device 105.

In this embodiment, based on the SID list included in the packet N1, after being sent from the network device 101, the packet N1 passes through the network device 102, the network device 103, and the network device 104, and arrives at the network device 105.

S203: The network device 105 receives the packet N1, and obtains information about a second forwarding path based on the information about the first forwarding path carried in the packet N1.

In this embodiment, the network device 105 may reverse a sequence of SIDs included in the SID list in the packet N1, to obtain the following SID list: 20005, 20004, 20003, 20003, and 20001. The SID list identifies a return path from the network device 105 to the network device 101, namely, the second forwarding path.

S204: The network device 105 generates a packet N2, where the packet N2 carries the information about the second forwarding path.

In this embodiment, the packet N2 carries an SID list: 20005, 20004, 20003, 20003, and 20001, to guide forwarding of the packet N2.

S205: The network device 105 sends the packet N2 to the network device 101.

Based on the SID list carried in the packet N2, after being sent from the network device 105, the packet N2 successively passes through the network device 104, the network device 103, and the network device 102, and finally arrives at the network device 101.

In this embodiment, because the forward packet N1 sent by the network device 101 to the network device 102 carries only information about the forward path, but does not carry information about the return path, after receiving the packet N1, the network device 105 obtains the information about the return path based on the information about the forward path carried in the packet N1, so that an amount of information carried in the forward packet N1 can be reduced while it can be ensured that the forward path and the return path are co-routed, and packet forwarding efficiency is improved.

In addition, similar to the embodiment shown in FIG. 2A and FIG. 2B, the packet sending method shown in FIG. 6 is also applicable to a cross-domain scenario. For a reason, refer to the foregoing description. Details are not described herein again.

Figure 7:
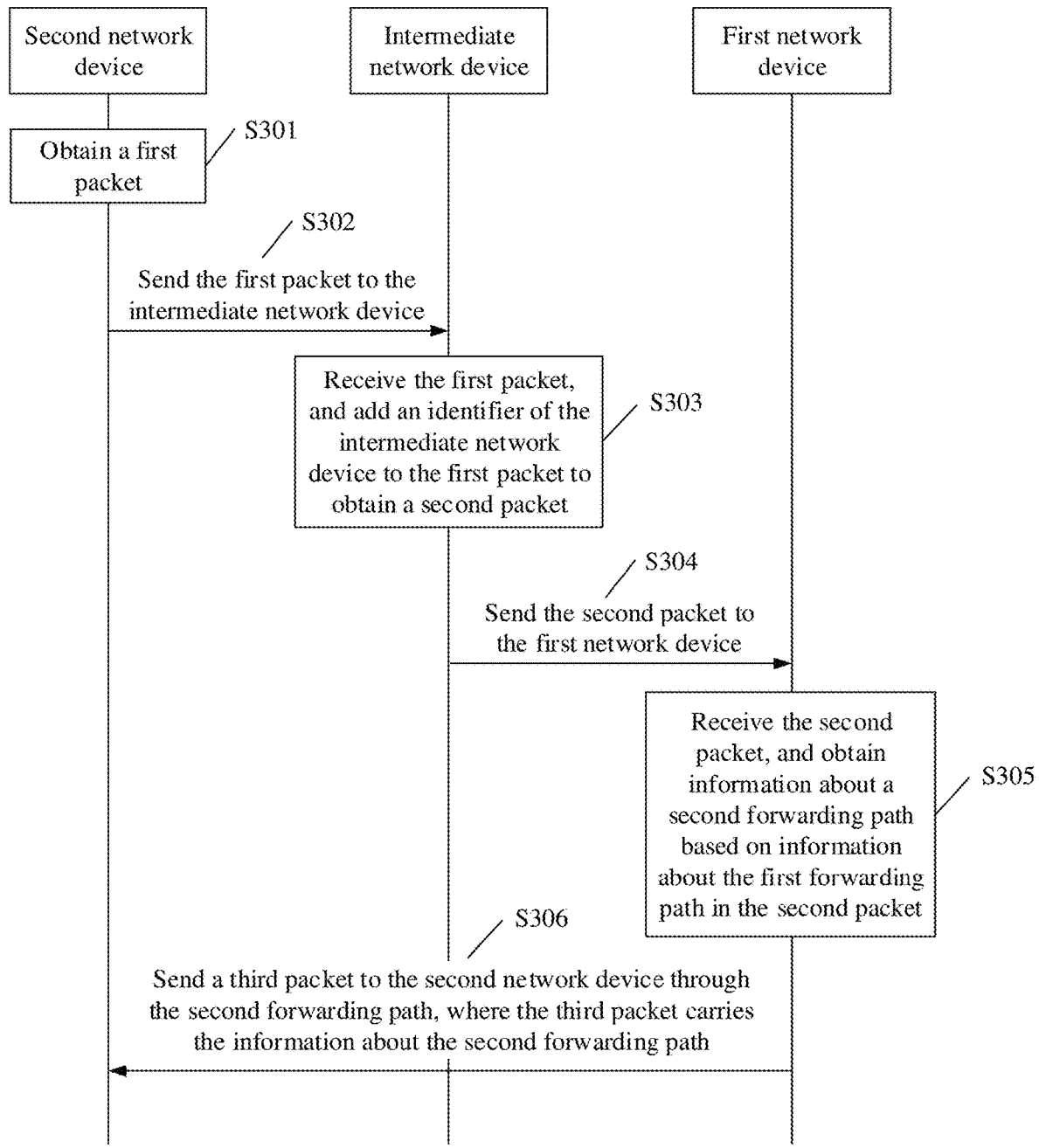
FIG. 7 is a schematic flowchart of still another packet sending method according to an embodiment of the present disclosure.

FIG. 7 is another schematic flowchart of a packet sending method according to an embodiment of the present disclosure.

The packet sending method provided in this embodiment includes the following steps.

S301: A second network device obtains a first packet.

In this embodiment, the second network device may be, for example, the network device 101 in the embodiment shown in FIG. 1. The first packet may be the packet M1 in the embodiment shown in FIG. 2A and FIG. 2B.

Optionally, the first packet includes an identifier of the second network device, and the identifier of the second network device may be used as a part of information about a first forwarding path. The first forwarding path is a forwarding path from the second network device to a first network device. For a specific example, refer to the embodiment shown in FIG. 2A and FIG. 2B. Details are not described herein again.

Optionally, the first packet may include indication information, and the indication information indicates the first network device to obtain information about a second forwarding path based on the information about the first forwarding path. The first network device may be the network device 105 in the embodiment shown in FIG. 2A and FIG. 2B. For a position of the indication information carried in the first packet, refer to the embodiment shown in FIG. 2A and FIG. 2B. Details are not described herein again.

It should be noted that, if the first packet is an SBFD packet, the indication information may be carried not only in an SRH of the SBFD packet, but also in another IPv6 extension header of the SBFD packet, for example, a hop-by-hop option header (HBH) or a destination address option header (DOH). This is not limited in this embodiment.

S302: The second network device sends the first packet to an intermediate network device.

In this embodiment, the intermediate network device may be any one of the network device 102, the network device 103, or the network device 104 in the embodiment shown in FIG. 1.

S303: The intermediate network device receives the first packet, and adds an identifier of the intermediate network device in the first packet to obtain a second packet.

In this embodiment, the identifier of the intermediate network device may be used as a part of the information about the first forwarding path. Optionally, in an SR scenario, the information about the first forwarding path may further include an SID corresponding to an interface used by the intermediate network device to receive the first packet. This manner is applicable to a scenario with load sharing. For a related example, refer to the embodiment shown in FIG. 2A and FIG. 2B. Details are not described herein again.

S304: The intermediate network device sends the second packet to the first network device.

In this embodiment, if there are a plurality of intermediate network devices between the first network device and the second network device, each intermediate network device may perform steps S304 and S305. Therefore, a second packet sent by each intermediate network device carries different information about the first forwarding path.

S305: The first network device receives the second packet, and obtains information about a second forwarding path based on information about a first forwarding path in the second packet.

In this embodiment, when the first network device is the network device 105 in the embodiment shown in FIG. 2A and FIG. 2B, the second packet received by the first network device may be, for example, the packet M4 in the embodiment shown in FIG. 2A and FIG. 2B. Correspondingly, for a specific description of obtaining, by the first network device, information about a second forwarding path based on the information about the first forwarding path, refer to the embodiment shown in FIG. 2A and FIG. 2B. Details are not described herein again.

S306: The first network device sends a third packet to the second network device through the second forwarding path, where the third packet the carries the information about the second forwarding path.

In this embodiment, when the first network device is the network device 105 in the embodiment shown in FIG. 2A and FIG. 2B, the third packet may be, for example, the packet M5 in the embodiment shown in FIG. 2A and FIG. 2B. Correspondingly, the information about the second forwarding path includes an SID list corresponding to the second forwarding path.

The second packet carries only the information about the first forwarding path, and does not carry the information about the second forwarding path. Therefore, in comparison with a conventional technology, a packet length of a forward packet is shortened, packet transmission efficiency is improved, and a forward path and a return path are co-routed.

In addition, because there is no need to rely on a controller, this embodiment is applicable to a scenario such as a cross-domain scenario, and can be applied in a wider scope compared with the conventional technology.

In addition, in this embodiment, the intermediate network device may also include, in the packet, the SID corresponding to the interface for receiving the first packet as the information about the first forwarding path. Therefore, this can not only implement that the first forwarding path and the second forwarding path can share a node and a link, but also is especially applicable to a scenario with load sharing, while this cannot be implemented in the conventional technology.

In this embodiment, the first packet and the second packet may further carry a timestamp, and the timestamp identifies a time point at which the second network device sends the first packet. After receiving the second packet, the first network device may obtain, through calculation, information such as a latency based on the timestamp carried in the second packet and a time point at which the second packet is received. When sending the third packet, the first network device may also add a timestamp in the third packet, so that the first network device obtains a packet forwarding latency through calculation based on the timestamp in the third packet and a time point at which the third packet is received.

Certainly, the first packet and the second packet may further include another type of network performance measurement information, and people skilled in the art may design a type of network performance measurement information based on an actual situation. Details are not described in the present disclosure.

Figure 8:
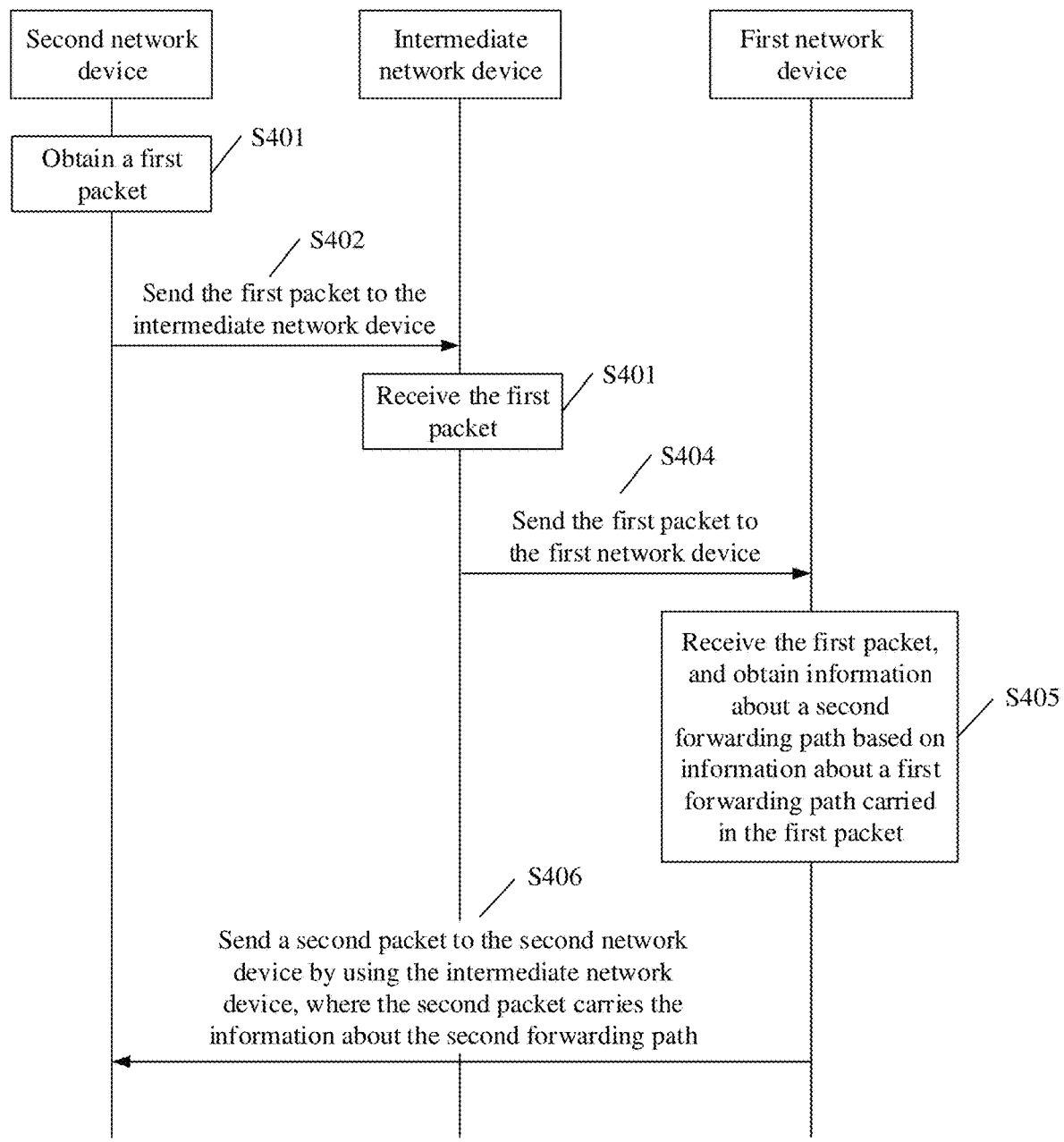
FIG. 8 is a schematic flowchart of yet another packet sending method according to an embodiment of the present disclosure.

FIG. 8 is still another schematic flowchart of a packet sending method according to an embodiment of the present disclosure.

The packet sending method provided in this embodiment includes the following steps.

S401: A second network device obtains a first packet.

In this embodiment, the second network device may be, for example, the network device 101 in the embodiment shown in FIG. 1. The first packet may be the packet N1 in the embodiment shown in FIG. 6.

The first packet includes information about a first forwarding path, and the first forwarding path is a forwarding path from the second network device to a first network device. In an SRv6 scenario, the information about the first forwarding path is expressed as the SID list carried in the SRH in the embodiment shown in FIG. 6. Certainly, in another scenario, the information about the first forwarding path may be further expressed in another manner. For example, in an SR MPLS scenario, the information about the first forwarding path may be further expressed as a label stack carried in the first packet, and the label stack includes a label corresponding to a network device on the first forwarding path.

Optionally, the first packet may further include indication information, and the indication information indicates a destination device of the first packet, namely, the first network device to obtain information about a second forwarding path based on the information about the first forwarding path. The second forwarding path is a reverse path of the first forwarding path. For a specific position of the indication information in the first packet, refer to the description of the embodiment shown in FIG. 2A and FIG. 2B. Details are not described herein again.

S402: The second network device sends the first packet to an intermediate network device.

In this embodiment, the intermediate network device may be any one of the network device 102, the network device 103, or the network device 104 in the embodiment shown in FIG. 1.

S403: The intermediate network device receives the first packet.

S404: The intermediate network device sends the first packet to a first network device.

In this embodiment, there may be one or more intermediate network devices between the second network device and the first network device. The intermediate network device sends the first packet to a next-hop network device based on the information about the first forwarding path in the first packet, until the first packet arrives at the first network device.

S405: The first network device receives the first packet, and obtains information about a second forwarding path based on information about a first forwarding path carried in the first packet.

In this embodiment, if the information about the first forwarding path is an SID list, the first network device may reverse the SID list corresponding to the first forwarding path, to obtain an SID list corresponding to the second forwarding path. In other words, SIDs included in the SID list of the first forwarding path and SIDs included in the SID list of the second forwarding path are the same and are arranged in sequences reverse to each other.

If the information about the first forwarding path is a label stack, the first network device may reverse the label stack corresponding to the first forwarding path, to obtain a label stack corresponding to the second forwarding path. In other words, labels included in the label stack of the first forwarding path and labels included in the label stack of the second forwarding path are the same and are arranged in sequences reverse to each other.

Certainly, the information about the first forwarding path and the information about the second forwarding path may be further expressed in another form, and people skilled in the art may design an expression based on a specific situation. Details are not described herein again.

S406: The first network device sends a second packet to the second network device by using the intermediate network device, where the second packet carries the information about the second forwarding path.

In this embodiment, the second packet may be the packet N2 in the embodiment shown in FIG. 6. For a related description, refer to the foregoing description. Details are not described herein again.

The first packet carries only the information about the first forwarding path, and does not carry the information about the second forwarding path. Therefore, in comparison with a conventional technology, a packet length of a forward packet is shortened, packet transmission efficiency is improved, and a forward path and a return path are co-routed.

In addition, because there is no need to rely on a controller, this embodiment is applicable to a scenario such as a cross-domain scenario, and can be applied in a wider scope compared with the conventional technology.

Figure 9:
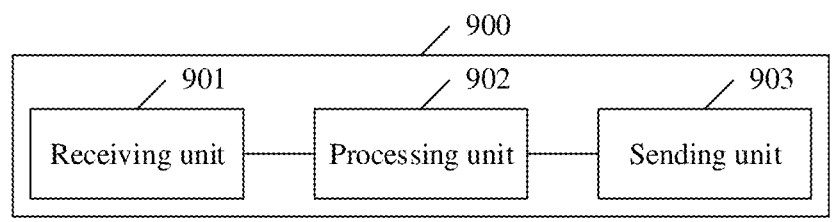
FIG. 9 is a schematic diagram of a structure of a first network device 900 according to an embodiment of the present disclosure.

FIG. 9 is a possible schematic diagram of a structure of the first network device in the foregoing embodiments. The first network device 900 may implement functions of the network device 105 in the embodiment shown in FIG. 2A and FIG. 2B or FIG. 6, or functions of the first network device in the embodiment shown in FIG. 7 or FIG. 8. Refer to FIG. 9. The first network device 900 includes: a receiving unit 901, a processing unit 902, and a sending unit 903. The receiving unit 901 and the processing unit 902 are configured to support the first network device 900 in performing S109 in FIG. 2A and FIG. 2B, S203 and S204 in FIG. 6, S305 in FIG. 7, or S405 in FIG. 8. The sending unit 903 is configured to support the first network device 900 in performing S110 in FIG. 2A and FIG. 2B, S205 in FIG. 6, S306 in FIG. 7, or S406 in FIG. 8 and/or another process performed by the first network device in the technology described in this specification. For example, the receiving unit 901 is configured to receive a first packet from a second network device, where the first packet includes information about a first forwarding path, and the first forwarding path is a forwarding path for sending the first packet from the second network device to the first network device. The processing unit 902 is configured to obtain information about a second forwarding path based on the information about the first forwarding path, where the second forwarding path is a reverse path of the first forwarding path. The sending unit 903 is configured to send a second packet to the second network device through the second forwarding path, where the second packet carries the information about the second forwarding path. For a specific execution process, refer to detailed descriptions of corresponding steps in the embodiment shown in FIG. 2A and FIG. 2B, FIG. 6, FIG. 7, or FIG. 8. Details are not described herein again.

It should be noted that, in embodiments of the present disclosure, division into the units is an example, and is merely logical function division. During actual implementation, another division manner may be used. Functional units in embodiments of the present disclosure may be integrated into one processing unit, or each of the units may exist alone physically, or two or more units are integrated into one unit. For example, in the foregoing embodiment, the obtaining unit and the processing unit may be a same unit or different units. The integrated unit may be implemented in a form of hardware, or may be implemented in a form of a software functional unit.

Figure 10:
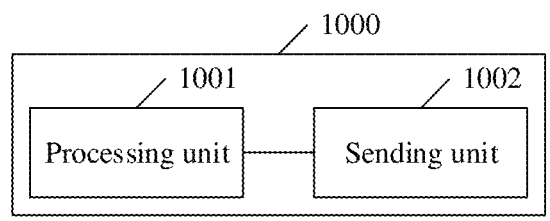
FIG. 10 is a schematic diagram of a structure of a second network device 1000 according to an embodiment of the present disclosure.

FIG. 10 is a possible schematic diagram of a structure of the second network device in the foregoing embodiments. The second network device 1000 may implement functions of the network device 101 in the embodiment shown in FIG. 2A and FIG. 2B or FIG. 6, or functions of the second network device in the embodiment shown in FIG. 7 or FIG. 8. Refer to FIG. 10. The second network device 1000 includes a processing unit 1001 and a sending unit 1002. The processing unit 1001 is configured to support the second network device 1000 in performing S101 in FIG. 2A and FIG. 2B, S201 and S204 in FIG. 6, S301 in FIG. 7, or S401 in FIG. 8. The sending unit 1002 is configured to support the second network device 1000 in performing S102 in FIG. 2A and FIG. 2B, S202 and S204 in FIG. 6, S302 in FIG. 7, or S402 in FIG. 8 and/or another process performed by the second network device in the technology described in this specification. For example, the processing unit 1001 is configured to obtain a first packet, where the first packet includes information about a first forwarding path, the first forwarding path is a forwarding path for sending the first packet from the second network device to a first network device, the information about the first forwarding path is used by the first network device to obtain information about a second forwarding path, and the second forwarding path is a reverse path of the first forwarding path. The sending unit 1002 is configured to send the first packet to the first network device. For a specific execution process, refer to detailed descriptions of corresponding steps in the embodiment shown in FIG. 2A and FIG. 2B, FIG. 6, FIG. 7, or FIG. 8. Details are not described herein again.

It should be noted that, in embodiments of the present disclosure, division into the units is an example, and is merely logical function division. During actual implementation, another division manner may be used. Functional units in embodiments of the present disclosure may be integrated into one processing unit, or each of the units may exist alone physically, or two or more units are integrated into one unit. For example, in the foregoing embodiment, the obtaining unit and the processing unit may be a same unit or different units. The integrated unit may be implemented in a form of hardware, or may be implemented in a form of a software functional unit.

Figure 11:
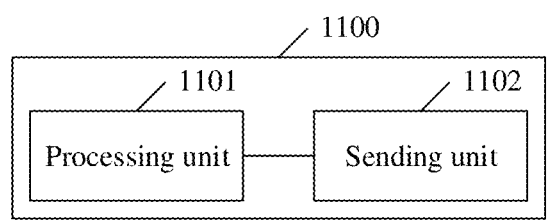
FIG. 11 is a schematic diagram of a structure of an intermediate network device 1100 according to an embodiment of the present disclosure.

FIG. 11 is a possible schematic diagram of a structure of the intermediate network device in the foregoing embodiments. The intermediate network device 1100 may implement functions of the network device 102, the network device 103, or the network device 104 in the embodiment shown in FIG. 2A and FIG. 2B, or functions of the intermediate network device in the embodiment shown in FIG. 7. Refer to FIG. 11. The intermediate network device 1100 includes a processing unit 1101 and a sending unit 1102. The processing unit 1101 is configured to support the intermediate network device 1100 in performing S103, S105, or S107 in FIG. 2A and FIG. 2B or S303 in FIG. 7. The sending unit 1102 is configured to support the intermediate network device 1100 in performing S104, S106, or S107 in FIG. 2A and FIG. 2B or S304 in FIG. 7 and/or another process performed by the intermediate network device in the technology described in this specification. For example, the processing unit 1101 is configured to obtain a first packet, where the first packet includes partial information of a first forwarding path, the first forwarding path is a forwarding path for sending the first packet from a source device to a destination device, the partial information of the first forwarding path is used by the destination device to obtain information about a second forwarding path, the second forwarding path is a reverse path of the first forwarding path, and the second forwarding path is from the destination device to the source device. The sending unit 1102 is configured to send the first packet to the destination device. For a specific execution process, refer to detailed descriptions of corresponding steps in the embodiment shown in FIG. 2A and FIG. 2B or FIG. 7. Details are not described herein again.

It should be noted that, in embodiments of the present disclosure, division into the units 5 is an example, and is merely logical function division. During actual implementation, another division manner may be used. Functional units in embodiments of the present disclosure may be integrated into one processing unit, or each of the units may exist alone physically, or two or more units are integrated into one unit. For example, in the foregoing embodiment, the obtaining unit and the processing unit may be a same unit or different units. The integrated unit may be implemented in a form of hardware, or may be implemented in a form of a software functional unit.

Figure 12:
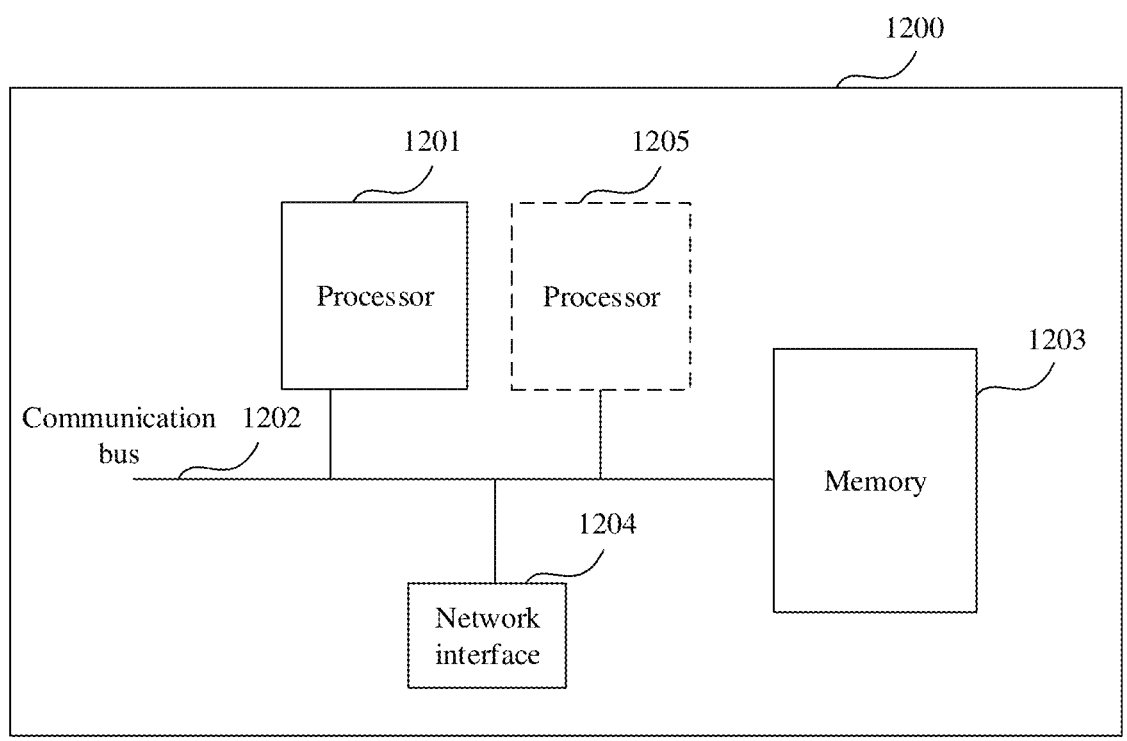
FIG. 12 is a schematic diagram of a structure of a device 1200 according to an embodiment of the present disclosure.

FIG. 12 is a schematic diagram of a structure of a device 1200 according to an embodiment of the present disclosure. The first network device 900 in FIG. 9, the second network device 1000 in FIG. 10, and the intermediate network device 1100 in FIG. 11 may be implemented by using the device 1200 shown in FIG. 12. Refer to FIG. 12. The device 1200 includes at least one processor 1201, a communication bus 1202, and at least one network interface 1204. Optionally, the device 1200 may further include a memory 1203.

The processor 1201 may be a general-purpose central processing unit (CPU), an application-specific integrated circuit (ASIC), or one or more integrated circuits (ICs) for controlling program execution of the solutions of the present disclosure. The processor may be configured to process a packet, to implement the packet sending method provided in embodiments of the present disclosure.

For example, when the first network device 900 in FIG. 9 is implemented by using the device shown in FIG. 12, the processor may be configured to obtain information about a second forwarding path based on information about a first forwarding path, where the second forwarding path is a reverse path of the first forwarding path. For specific function implementation, refer to a processing part of the network device 105 in the embodiment shown in FIG. 2A and FIG. 2B or FIG. 6 or the first network device in the embodiment shown in FIG. 7 or FIG. 8. For another example, when the second network device 1000 in FIG. 10 is implemented by using the device shown in FIG. 12, the processor may be configured to obtain a first packet. For specific function implementation, refer to a processing part of the network device 101 in the embodiment shown in FIG. 2A and FIG. 2B or FIG. 6 or the second network device in the embodiment shown in FIG. 7 or FIG. 8. For another example, when the intermediate network device 1100 in FIG. 11 is implemented by using the device shown in FIG. 12, the processor may be configured to obtain a first packet. For specific function implementation, refer to a processing part of the network device 102, the network device 103, or the network device 104 in the embodiment shown in FIG. 2A and FIG. 2B or the intermediate network device in the embodiment shown in FIG. 7.

The communication bus 1202 is configured to transmit information between the processor 1201, the network interface 1204, and the memory 1203.

The memory 1203 may be a read-only memory (ROM) or another type of static storage device that may store static information and instructions. The memory 1203 may alternatively be a random access memory (RAM) or another type of dynamic storage device that may store information and instructions, or may be a compact disc read-only memory (CD-ROM) or another optical disc storage, an optical disc storage (including a compact disc, a laser disc, an optical disc, a digital versatile disc, a Blu-ray disc, and the like), a disk storage medium or another magnetic storage device, or any other medium that can be configured to carry or store expected program code in a form of instructions or a data structure and that can be accessed by a computer. However, the memory is not limited thereto. The memory 1203 may exist independently, and is connected to the processor 1201 through the communication bus 1202. The memory 1203 may be alternatively integrated with the processor 1201.

Optionally, the memory 1203 is configured to store program code or instructions for executing the solutions of the present disclosure, and the processor 1201 controls the execution. The processor 1201 is configured to execute the program code or the instructions stored in the memory 1203. The program code may include one or more software modules. Optionally, the processor 1201 may alternatively store the program code or the instructions for executing the solutions of the present disclosure. In this case, the processor 1201 does not need to read the program code or the instructions from the memory 1203.

The network interface 1204 may be an apparatus such as a transceiver, and is configured to communicate with another device or a communication network. The communication network may be an Ethernet, a radio access network (RAN), a wireless local area network (WLAN), or the like. In this embodiment, the network interface 1204 may be configured to receive a packet sent by another node in a segment routing network, or send a packet to another node in the segment routing network. The network interface 1204 may be an Ethernet interface, a fast Ethernet (FE) interface, a gigabit Ethernet (GE) interface, or the like.

During specific implementation, in an embodiment, the device 1200 may include a plurality of processors, for example, the processor 1201 and the processor 1205 shown in FIG. 12. Each of the processors may be a single-core (single-CPU) processor, or may be a multi-core processor (multi-CPU). The processor herein may refer to one or more devices, circuits, and/or processing cores configured to process data (for example, computer program instructions).

Figure 13:
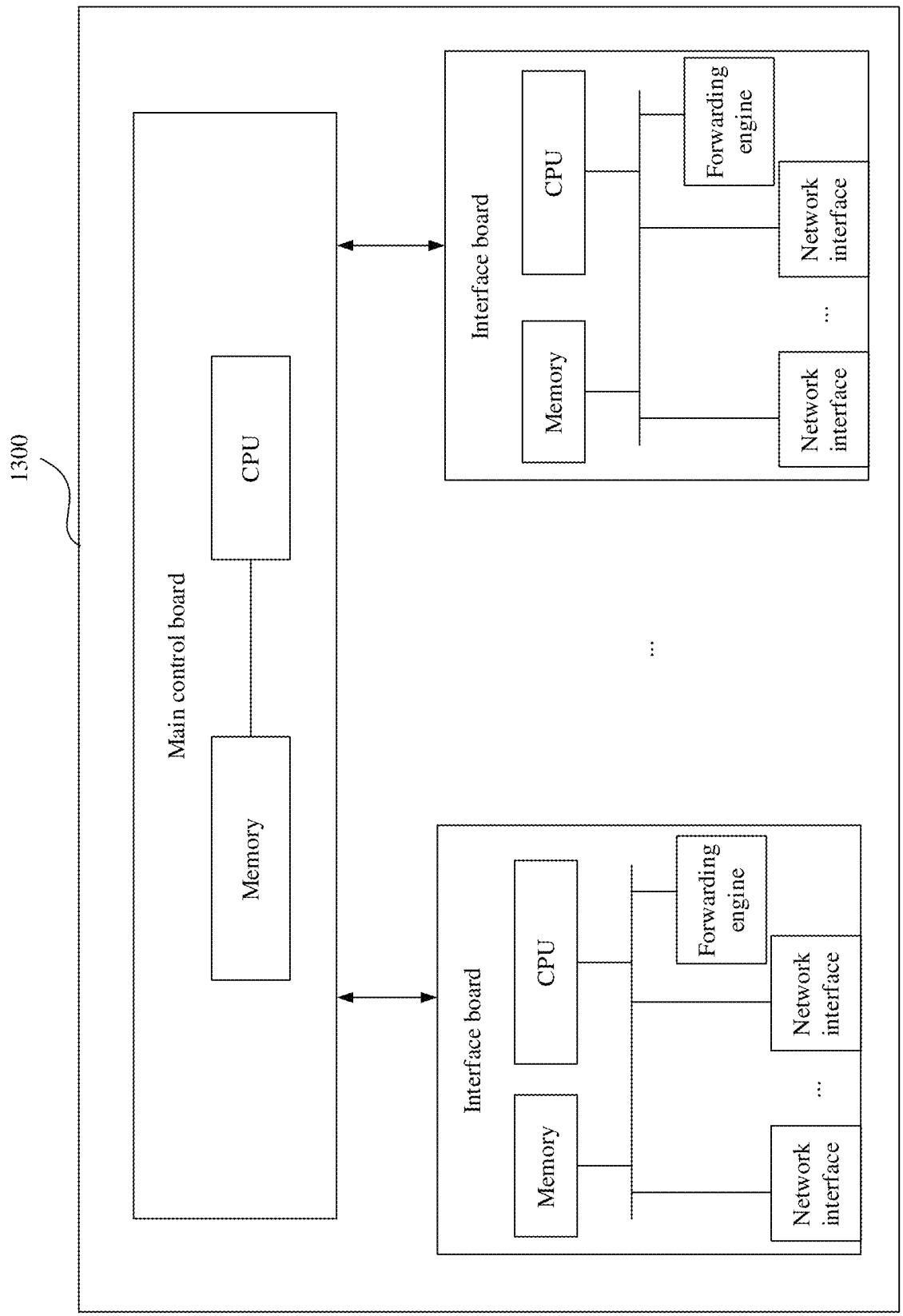
FIG. 13 is a schematic diagram of a structure of a device 1300 according to an embodiment of the present disclosure.

FIG. 13 is a schematic diagram of a structure of a device 1300 according to an embodiment of the present disclosure. The first network device 900 in FIG. 9, the second network device 1000 in FIG. 10, and the intermediate network device 1100 in FIG. 11 may be implemented by using the device shown in FIG. 13. Refer to the schematic diagram of the structure of the device shown in FIG. 13. The device 1300 includes a main control board and one or more interface boards. The main control board is communicatively connected to the interface board. The main control board is also referred to as a main processing unit (MPU) or a route processor card. The main control board includes a CPU and a memory, and is responsible for controlling and managing each component in the device 1300, including route computation, and device management and maintenance functions. The interface board is also referred to as a line processing unit (LPU) or a line card, and is configured to receive and send a packet. In some embodiments, the main control board communicates with the interface board through a bus, or the interface boards communicate with each other through a bus. In some embodiments, the interface boards communicate with each other through a switching board. In this case, the device 1300 also includes the switching board. The switching board is communicatively connected to the main control board and the interface boards, and is configured to forward data between the interface boards. The switching board may also be referred to as a switch fabric unit (SFU). The interface board includes a CPU, a memory, a forwarding engine, and an interface card (IC). The interface card may include one or more network interfaces. The network interface may be an Ethernet interface, an FE interface, a GE interface, or the like. The CPU is communicatively connected to the memory, the forwarding engine, and the interface card. The memory is configured to store a forwarding table. The forwarding engine is configured to forward a received packet based on the forwarding table stored in the memory. If a destination address of the received packet is an IP address of the device 1300, the forwarding engine sends the packet to the CPU of the main control board or the interface board for processing. If a destination address of the received packet is not an IP address of the device 1300, the forwarding engine searches the forwarding table based on the destination address. If a next hop and an outbound interface that correspond to the destination address are found from the forwarding table, the forwarding engine forwards the packet to the outbound interface corresponding to the destination address. The forwarding engine may be a network processor (NP). The interface card, also referred to as a subcard, may be installed on the interface board. The interface card is responsible for converting an optical/electrical signal into a data frame, checking validity of the data frame, and forwarding the data frame to the forwarding engine for processing or the CPU of the interface board. In some embodiments, the CPU may also perform functions of the forwarding engine, such as implementing software forwarding based on a general-purpose CPU, so that no forwarding engine is required in the interface board. In some embodiments, the forwarding engine may be implemented by using an ASIC or a field programmable gate array (FPGA). In some embodiments, the memory that stores the forwarding table may alternatively be integrated into the forwarding engine, and is used as a part of the forwarding engine.

An embodiment of the present disclosure provides a network system. The system is configured to implement the packet sending method in the foregoing method embodiments. The system includes at least two of a first network device, a second network device, and an intermediate network device. The first network device may implement functions of the first network device 900 in the embodiment shown in FIG. 9, the second network device may implement functions of the second network device 1000 in the embodiment shown in FIG. 10, and the intermediate network device may implement functions of the intermediate network device 1100 in the embodiment shown in FIG. 11. For a specific execution process, refer to detailed descriptions of corresponding steps in the embodiment shown in FIG. 2A and FIG. 2B, FIG. 6, FIG. 7, or FIG. 8. Details are not described herein again.

An embodiment of the present disclosure further provides a chip system, including a processor. The processor is coupled to a memory. The memory is configured to store a program or instructions. When the program or the instructions are executed by the processor, the chip system is enabled to implement the method of the network device 101 to the network device 105 in the embodiment shown in FIG. 2A and FIG. 2B or FIG. 6, or to perform the method of the first network device, the second network device, or the intermediate network device in the embodiment shown in FIG. 7 or FIG. 8.

Optionally, there may be one or more processors in the chip system. The processor may be implemented by hardware, or may be implemented by software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may alternatively be one or more memories in the chip system. The memory may be integrated with the processor, or may be disposed separately from the processor. This is not limited in the present disclosure. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in the present disclosure.

For example, the chip system may be an FPGA, an ASIC, a system on chip (SoC), a CPU, an NP, a digital signal processor (DSP), a microcontroller unit (MCU), a programmable logic device (PLD), or another integrated chip.

It should be understood that the steps in the foregoing method embodiments may be completed by using a hardware integrated logic circuit or instructions in a form of software in the processor. The steps in the methods disclosed with reference to embodiments of the present disclosure may be directly performed and completed by a hardware processor, or may be performed and completed by using a combination of hardware in the processor and a software module.

An embodiment of the present disclosure further provides a computer-readable storage medium, including instructions. When the instructions are run on a computer, the computer is enabled to perform the methods in the foregoing embodiments.

In the specification, claims, and accompanying drawings of the present disclosure, the terms "first", "second", "third", "fourth", and so on are intended to distinguish between similar objects but do not necessarily indicate a specific sequence or order. It should be understood that, the data termed in such a way is interchangeable in proper circumstances, so that embodiments described herein can be implemented in a sequence other than the sequence illustrated or described herein. In addition, the terms "include", "have" and any other variants thereof are intended to cover non-exclusive inclusion. For example, a process, method, system, product, or device that includes a list of steps or units is not necessarily limited to those steps or units that are expressly listed, but may include other steps or units that are not expressly listed or inherent to the process, method, product, or device.

In the present disclosure, "at least one item (piece)" means one or more, and "a plurality of" means two or more. "At least one of the following items (pieces)" or a similar expression thereof indicates any combination of these items, including a single item (piece) or any combination of a plurality of items (pieces). For example, at least one item (piece) of a, b, or c may represent: a, b, c, a and b, a and c, b and c, or a, b, and c, where a, b, and c may be singular or plural. In the present disclosure, it is considered that "A and/or B" includes only A, only B, or A and B.

It may be clearly understood by people skilled in the art that, for the purpose of convenient and brief description, for detailed working processes of the foregoing system, apparatus, and unit, refer to corresponding processes in the foregoing method embodiments. Details are not described herein again.

In the several embodiments provided in the present disclosure, it should be understood that the disclosed system, apparatus, and method may be implemented in another manner. For example, the described apparatus embodiments are merely examples. For example, division into the units is merely logical module division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, to be specific, may be located in one position, or may be distributed on a plurality of network units. Some or all of the units may be obtained based on actual requirements to achieve the objectives of the solutions of embodiments.

In addition, module units in embodiments of the present disclosure may be integrated into one processing unit, or each of the units may exist alone physically, or two or more units are integrated into one unit. The integrated unit may be implemented in a form of hardware, or may be implemented in a form of a software module unit.

When the integrated unit is implemented in the form of a software module unit and sold or used as an independent product, the integrated unit may be stored in a computer-readable storage medium. Based on such an understanding, the technical solutions of the present disclosure essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the method in embodiments of the present disclosure. The storage medium includes any medium that can store program code, such as a USB flash drive, a removable hard disk, a read-only memory (ROM), a random access memory (RAM), a magnetic disk, or an optical disc.

People skilled in the art should be aware that in the foregoing one or more examples, functions described in the present disclosure may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium that can be accessed by a general-purpose or a dedicated computer.

The objectives, technical solutions, and beneficial effects of the present disclosure are further described in detail in the foregoing specific implementations. It should be understood that the foregoing descriptions are merely specific implementations of the present disclosure.

In conclusion, the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments, or make equivalent replacements to some technical features thereof. However, the modifications and replacements do not make the essence of the corresponding technical solutions depart from the scope of the technical solutions of embodiments of the present disclosure.

What is claimed is:

1. A packet sending method, comprising:
receiving, by a first network device, a first packet from a second network device, wherein the first packet comprises information about a first forwarding path, and the first packet is sent from the second network device to the first network device through the first forwarding path;
obtaining, by the first network device, information about a second forwarding path based on the information about the first forwarding path, wherein the second forwarding path is a reverse path of the first forwarding path; and
sending, by the first network device, a second packet to the second network device through the second forwarding path, wherein the second packet carries the information about the second forwarding path,
wherein the first packet comprises indication information indicating first network device to obtain the information about the second forwarding path based on the information about the first forwarding path, and
the obtaining, by the first network device, information about a second forwarding path based on the information about the first forwarding path comprises:
obtaining, by the first network device, the information about the second forwarding path based on the information about the first forwarding path and the indication information.

2. The method according to claim 1, wherein the first packet is a bidirectional forwarding detection (BFD) packet, and the indication information is carried in a reserved R field of the BFD packet; or
the first packet is a two-way active measurement protocol (TWAMP) packet or a simple two-way active measurement protocol (STAMP) packet, and the indication information is carried in a type length value (TLV) field of the TWAMP packet or the STAMP packet; or
the first packet is a seamless bidirectional forwarding detection (SBFD) packet, and the indication information is carried in an internet protocol version 6 (IPv6) extension header of the SBFD packet.

3. The method according to claim 1, wherein the first forwarding path passes through a third network device, and the information about the first forwarding path comprises an identifier of the third network device.

4. The method according to claim 1, wherein the first forwarding path passes through a third network device, and the information about the first forwarding path comprises a segment identifier (SID) corresponding to an interface used by the third network device to receive the first packet.

5. The method according to claim 1, wherein the first packet comprises in-band operations, administration and maintenance (IOAM) including the information about the first forwarding path or in-band network telemetry (INT) including the information about the first forwarding path.

6. The method according to claim 1, wherein the first packet comprises a segment routing header (SRH), and the information about the first forwarding path is carried in the SRH.

7. The method according to claim 6, wherein the information about the first forwarding path comprises a first segment identifier (SID) list, the information about the second forwarding path comprises a second SID list, and segment identifiers (SIDs) comprised in the second SID list and SIDs comprised in the first SID list are the same, and are arranged in sequences reverse to each other.

8. An apparatus, comprising:
at least one processor;
at least one non-transitory computer-readable storage medium storing a program including instructions that, when executed by the at least one processor, cause the apparatus to:
receive a first packet from a second network device, wherein the first packet comprises information about a first forwarding path, and the first packet is sent from the second network device to the apparatus through the first forwarding path;
obtain information about a second forwarding path based on the information about the first forwarding path, wherein the second forwarding path is a reverse path of the first forwarding path; and
send a second packet to the second network device through the second forwarding path, wherein the second packet carries the information about the second forwarding path,
wherein the first packet comprises indication information indicating the apparatus to obtain the information about the second forwarding path based on the information about the first forwarding path, and
the obtaining information about a second forwarding path based on the information about the first forwarding path comprises:
obtaining the information about the second forwarding path based on the information about the first forwarding path and the indication information.

9. The apparatus according to claim 8, wherein the first packet is a bidirectional forwarding detection (BFD) packet, and the indication information is carried in a reserved R field of the BFD packet; or the first packet is a two-way active measurement protocol (TWAMP) packet or a simple two-way active measurement protocol (STAMP) packet, and the indication information is carried in a type length value (TLV) field of the TWAMP packet or the STAMP packet; or the first packet is a seamless bidirectional forwarding detection (SBFD) packet, and the indication information is carried in an internet protocol version 6 IPv6 extension header of the SBFD packet.

10. The apparatus according to claim 8, wherein the first forwarding path passes through a third network device, and the information about the first forwarding path comprises an identifier of the third network device.

11. The apparatus according to claim 8, wherein the first forwarding path passes through a third network device, and the information about the first forwarding path comprises a segment identifier (SID) corresponding to an interface used by the third network device to receive the first packet.

12. The apparatus according to claim 8, wherein the first packet comprises in-band operations, administration and maintenance (IOAM) including the information about the first forwarding path or in-band network telemetry (INT including the information about the first forwarding path.

13. The apparatus according to claim 8, wherein the first packet comprises a segment routing header (SRH), and the information about the first forwarding path is carried in the SRH.

14. The apparatus according to claim 13, wherein the information about the first forwarding path comprises a first segment identifier (SID) list, the information about the second forwarding path comprises a second SID list, and segment identifiers (SIDs) comprised in the second SID list and SIDs comprised in the first SID list are the same, and are arranged in sequences reverse to each other.

15. A non-transitory storage medium storing a program, which, when executed by one or more processors, cause the one or more processors to perform operations comprising:

receiving a first packet from a second network device, wherein the first packet comprises information about a first forwarding path, and the first packet is sent from the second network device to a first network device through the first forwarding path;

obtaining information about a second forwarding path based on the information about the first forwarding path, wherein the second forwarding path is a reverse path of the first forwarding path; and sending a second packet to the second network device through the second forwarding path, wherein the second packet carries the information about the second forwarding path, wherein the first packet comprises indication information indicating the first network device to obtain the information about the second forwarding path based on the information about the first forwarding path, and the obtaining information about a second forwarding path based on the information about the first forwarding path comprises:

obtaining the information about the second forwarding path based on the information about the first forwarding path and the indication information.

16. The non-transitory storage medium according to claim 15, wherein the first packet is a bidirectional forwarding detection (BFD) packet, and the indication information is carried in a reserved R field of the BFD packet; or the first packet is a two-way active measurement protocol (TWAMP) packet or a simple two-way active measurement protocol (STAMP) packet, and the indication information is carried in a type length value (TLV) field of the TWAMP packet or the STAMP packet; or the first packet is a seamless bidirectional forwarding detection (SBFD) packet, and the indication information is carried in an internet protocol version 6 (IPv6) extension header of the SBFD packet.

17. The non-transitory storage medium according to claim 15, wherein the first forwarding path passes through a third network device, and the information about the first forwarding path comprises an identifier of the third network device.

* * * * *